US011392545B1

(12) United States Patent
Patel et al.

(10) Patent No.: US 11,392,545 B1
(45) Date of Patent: Jul. 19, 2022

(54) TRACKING ACCESS PATTERN OF INODES AND PRE-FETCHING INODES

(71) Applicant: Veritas Technologies LLC, Santa Clara, CA (US)

(72) Inventors: Bhautik Patel, Gujarat (IN); Freddy James, Kerala (IN); Mitul Kothari, Madhya Pradesh (IN); Anindya Banerjee, Maharashtra (IN)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 344 days.

(21) Appl. No.: 16/559,686

(22) Filed: Sep. 4, 2019

Related U.S. Application Data

(63) Continuation of application No. 15/279,694, filed on Sep. 29, 2016, now Pat. No. 10,467,190.

(51) Int. Cl.
*G06F 16/13* (2019.01)
*G06F 16/172* (2019.01)
*G06F 16/14* (2019.01)

(52) U.S. Cl.
CPC .............. *G06F 16/13* (2019.01); *G06F 16/14* (2019.01); *G06F 16/172* (2019.01)

(58) Field of Classification Search
CPC ......... G06F 16/13; G06F 16/14; G06F 16/172
See application file for complete search history.

(56) References Cited

U.S. PATENT DOCUMENTS

| 6,973,542 | B1 | 12/2005 | Schmuck et al. |
| 8,732,406 | B1 | 5/2014 | Pase et al. |
| 9,846,655 | B1 * | 12/2017 | Zhao ...................... G06F 3/061 |
| 2008/0140997 | A1 | 6/2008 | Tripathi |
| 2008/0270706 | A1 | 10/2008 | Fair et al. |
| 2009/0055399 | A1 | 2/2009 | Lu et al. |
| 2013/0086121 | A1 | 4/2013 | Preslan |

FOREIGN PATENT DOCUMENTS

EP 0890916 A2 1/1999

* cited by examiner

*Primary Examiner* — Truong V Vo

(57) ABSTRACT

Methods, computer program products, computer systems, and the like are disclosed that provide for the tracking of access patterns of inodes, and the issuing of inode read-ahead instructions, in order to pre-fetch inodes. Such a method can include, for example, identifying a unit of metadata in a file system, identifying a file system structure in the file system, determining whether a file structure of the file system structure is non-sequential, and, in response to a determination that the file structure is non-sequential, retrieving a list of units of metadata. In such embodiments, the file system structure is associated with the unit of metadata, and the determining includes accessing the file system structure. Further, in certain embodiments, the units of metadata identified in the list of units of metadata are stored in a storage device of the computer system.

20 Claims, 15 Drawing Sheets

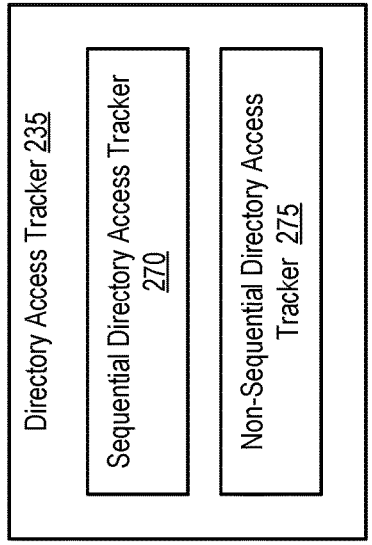
FIG. 2B
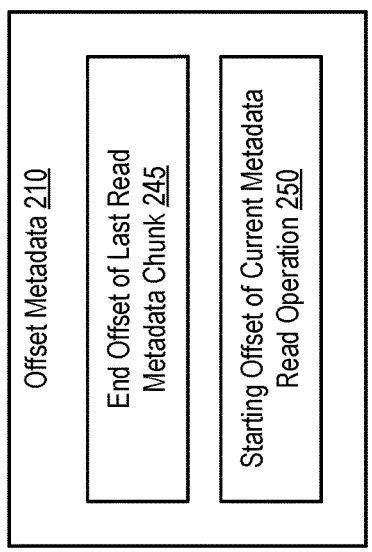
FIG. 2C
FIG. 2D
FIG. 2E

Sequential Inode Structure 300A

| Directory 265(1) | |
|---|---|
| File Name Field 305 | Inode No. Field 310 |
| File 315(1) | On-Disk Inode 165(4) |
| File 315(2) | On-Disk Inode 165(5) |
| File 315(3) | On-Disk Inode 165(6) |
| File 315(4) | On-Disk Inode 165(7) |
| File 315(5) | On-Disk Inode 165(8) |
| File 315(6) | On-Disk Inode 165(9) |

FIG. 3A

Non-Sequential Inode Structure 300B

| Directory 265(2) | |
|---|---|
| File Name Field 305 | Inode No. Field 310 |
| File 315(1) | On-Disk Inode 165(4) |
| File 315(2) | On-Disk Inode 165(9) |
| File 315(3) | On-Disk Inode 165(15) |
| File 315(4) | On-Disk Inode 165(11) |
| File 315(5) | On-Disk Inode 165(19) |
| File 315(6) | On-Disk Inode 165(6) |

Cache 205

Parent Directory List

| Dir. Inode 130(1) | Dir. Inode 130(2) | Add? | Dir. Inode 130(4) | Dir. Inode 130(5) |
|---|---|---|---|---|
| 1 | 0 | Set? | 1 | 0 |

FIG. 3C

TRACKING ACCESS PATTERN OF INODES AND PRE-FETCHING INODES

CROSS-REFERENCE TO RELATED APPLICATIONS

The present patent application is a continuation of U.S. patent application Ser. No. 15/279,694, filed on Sep. 29, 2016, entitled "Tracking Access Pattern of Modes and Pre-Fetching Modes," and having Bhautik Patel, Freddy James, Mitul Kothari, and Anindya Banerjee as inventors, which is incorporated by reference herein, in its entirety and for all purposes.

FIELD OF THE DISCLOSURE

This disclosure relates to data access. In particular, this disclosure relates to tracking access patterns of inodes, and issuing inode read-ahead instructions to pre-fetch inodes.

DESCRIPTION OF THE RELATED ART

A file system is used to control how data is stored and retrieved for computing purposes (e.g., for storing and executing applications). A data object in a file system (e.g., a file, a directory, or the like) has one or more inodes. An inode is a data structure that is used to identify data belonging to the data object in the file system. The inode stores attributes (e.g., metadata) and disk block location(s) of the data object's data.

Accessing a file in a file system requires the file's inode to be read from disk (e.g., from a non-volatile storage unit). Data operations such as backup, periodic scans, administrative operations, and the like, typically access multiple inodes on disk. Reading such "on-disk" inodes from disk can negatively impact application performance. For example, if the underlying disk is slow, reading on-disk inodes from disk can result in unreasonable and/or significant input/output (I/O) wait time before an application can be serviced with the required data.

A file's contents can be loaded into memory (e.g., Random Access Memory (RAM)) such that when the file is subsequently accessed, the file's contents are read from RAM rather than from disk (e.g., a Hard Disk Drive (HDD)). However, loading a file's contents into memory requires inodes that correspond to the file's contents to be accessed from disk.

SUMMARY OF THE DISCLOSURE

The present disclosure describes methods, computer program products, computer systems, and the like that provide for the tracking of access patterns of inodes, and the issuing of inode read-ahead instructions, in order to pre-fetch inodes. Such a method can include, for example, identifying a unit of metadata in a file system, identifying a file system structure in the file system, determining whether a file structure of the file system structure is non-sequential, and, in response to a determination that the file structure is non-sequential, retrieving a list of units of metadata. In such embodiments, the file system structure is associated with the unit of metadata, and the determining includes accessing the file system structure. Further, in certain embodiments, the units of metadata identified in the list of units of metadata are stored in a storage device of the computer system.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 2B is a block diagram of offset metadata of inodes, according to one embodiment of the present disclosure.

FIG. 2C is a table illustrating the contents of a global inode list/parent directory list, according to one embodiment of the present disclosure.

FIG. 2D is a block diagram of a directory access tracker, according to one embodiment of the present disclosure.

FIG. 2E is a block diagram of a metadata read-ahead generator, according to one embodiment of the present disclosure.

FIG. 3A is a block diagram of a directory with sequential inodes, according to one embodiment of the present disclosure.

FIG. 3B is a block diagram of a directory with non-sequential inodes, according to one embodiment of the present disclosure.

FIG. 3C is a block diagram of a cache that implements a global inode list, according to one embodiment of the present disclosure.

Figure 1A:
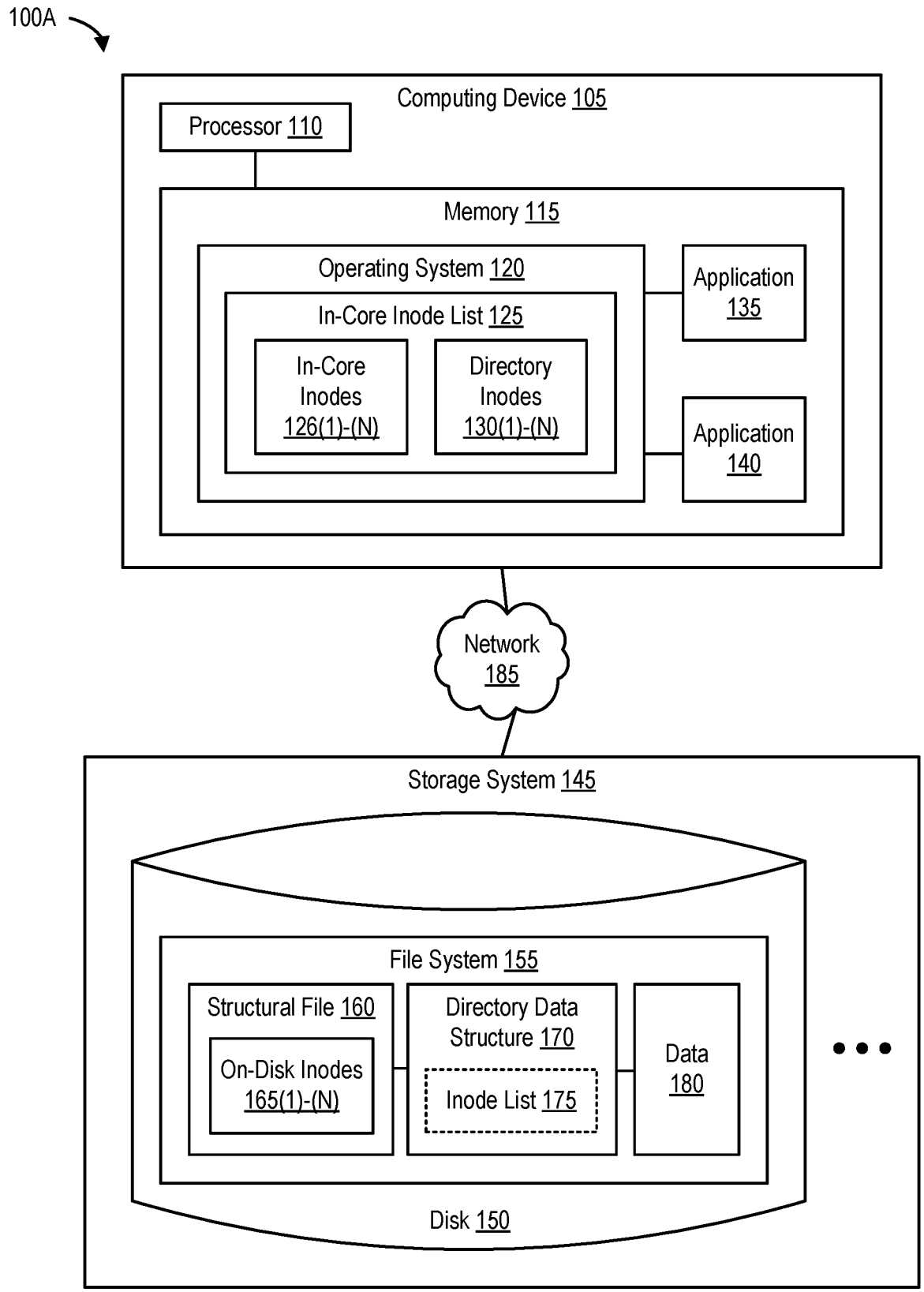
FIG. 1A is a block diagram of a system that tracks the access pattern of inodes and pre-fetches inodes, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A file system (e.g., a Unix file system) is used to organize data and control how that data is stored and retrieved. A file system is responsible for organizing data objects such as files and directories, and for keeping track of which areas of a storage device (e.g., a Hard Disk Drive (HDD), a Solid State Drive (SSD), and/or the like) belong to which data objects. Typically, each data object in a file system (e.g., a file, a directory, or the like) has a corresponding inode.

An inode is a data structure used to locate data in a file system. An inode stores attributes (e.g., metadata) and disk block location(s) of the data object's data, and can be identified by an integer number (e.g., called an inode number). Directories can include lists of names assigned to inodes. A directory contains an entry for itself, an entry for the directory's parent, and entries for each of the directory's children.

Accessing a file in a file system typically involves the file's inode to be read from disk (e.g., from a non-volatile storage unit), for example, to determine changes and/or modifications to the file's contents, and in certain cases, also to verify owner and permission information (e.g., group-id, user-id, permissions, and the like). Therefore, before a file's contents can be accessed, the file's inode (metadata) has to be first read from disk.

Data operations (e.g., input/output (I/O) operations) typically require the access of multiple inodes on disk, and reading such "on-disk" inodes from disk can negatively impact application performance (e.g., in the form of I/O wait time before a given I/O operation can be completed). Also as previously noted, a file's contents can be "read-ahead" and loaded into memory (e.g., Random Access Memory (RAM)) such that when the file is subsequently accessed, the file's contents are read from RAM rather than from disk (e.g., HDD). Therefore, pre-fetching data in this manner (e.g., to accelerate data access) requires tracking of access pattern(s) of inodes to "read-ahead" these inodes, before data associated with those inodes (e.g., files, directories, and the like) can be preemptively loaded into memory.

Unfortunately, unlike file data, the efficient tracking of inode metadata access pattern(s) is challenging because of at least two reasons. First, multiple I/O operations (e.g., from multiple applications executing in a cluster) can access the same inode simultaneously. Tracking the inode access pattern(s) of multiple I/O operations can be memory and computing resource intensive, and can result in significant overhead. Second, the tracking of inode access pattern(s) also requires the efficient "read-ahead" of such inodes (e.g., by issuing read-ahead instructions), also without negatively impacting system performance.

Disclosed herein are methods, systems, and processes capable of tracking access patterns of inodes based on chunk access, sequential access, and non-sequential access, and issuing read-ahead instructions for inodes, among other capabilities.

Example System that Tracks Inode Access Pattern(s) and Issues Read-Ahead

FIG. 1A is a block diagram of a computing system 100A that is configured to track the access pattern(s) of inodes and pre-fetch inodes, according to one embodiment. As shown in FIG. 1A, computing device 105 includes a processor 110 and a memory 115. Computing device 105 can be any type of computing system including a server, a desktop, a laptop, a tablet, and the like, and is communicatively coupled to storage system 145 via network 185. Network 185 can be any type of network and/or interconnection (e.g., a Local Area Network (LAN), a Wide Area Network (WAN), a Storage Area Network (SAN), the Internet, and the like).

Storage system 145 can include a variety of different storage devices, including hard disks, compact discs, digital versatile discs, SSD memory such as Flash memory, and the like, or one or more logical storage devices such as volumes implemented on one or more such physical storage devices. Storage system 145 includes one or more of such storage devices (e.g., disk 150). In one embodiment, disk 150 is a non-volatile storage unit. In other embodiments, disk 150 is a HDD or a SSD. Disk 150 includes file system 155. File system 155 can be any type of file system (e.g., a Unix file system, an extent-based file system, and the like).

An operating system 120, and applications 135 and 140 are stored in memory 115, and executed by operating system 120. Operating system 120 further includes an in-core inode list 125 (e.g., with multiple in-core inodes 126(1)-(N)), including directory inodes 130(1)-(N). Directory inodes 130(1)-(N) are parent directory representations of on-disk inodes in in-core mode list 125, for example (which includes in-core inodes for files, directories, and the like). File system 155 includes a structural file 160, a directory data structure 170, and data 180. Structural file 160 includes on-disk inodes 165(1)-(N), and directory data structure 170 includes an inode list 175. In one embodiment, structural file 160 is an iList file. In this embodiment, the iList file is a file that maintains a listing of on-disk inodes (e.g., on-disk inodes 165(1)-(N)).

Data objects (e.g., a file, a directory, and/or the like) in file system 155 are associated with corresponding inodes (e.g., on-disk inodes 165(1)-(N)). Each on-disk inode has a specific inode number and is stored on disk 150 (e.g., as on-disk inodes 165(1)-(N), and as part of structural file 160). In-core inode list 125 is an in-memory data structure (or list) for one (or more) on-disk inodes. In-core inode list 125 includes the metadata that is stored as part of on-disk inodes 165(1)-(N), as well as other additional metadata.

File system 155 includes directory data structure 170. Directory data structure 170 includes inode list 175. The parent of a data object (e.g., a file, a sub-directory, or the like), is a directory of which the given data object is part of. For example, if a given directory (e.g., /home/john) contains four data objects (e.g., file1, file2, file3, and dir1 with pathnames /home/john/file1, /home/john/file2, /home/john/ file3, and /home/john/dir1, respectively), then the parent directory of these directory entries (e.g., file1, file2, file3, and dir1) is "john." Each data object also has a corresponding and/or associated on-disk inode (e.g., on-disk inode 165(1) for "john," on-disk inode 165(2) for "file1," on-disk inode 165(3) for "file2," and on-disk inode 165(4) for "file3," and on-disk inode 165(5) for "did"). In this scenario, the parent (directory) inode number of on-disk inodes 165 (2), 165(3), 165(4), and 165(5) is on-disk inode 165(1) (shown as directory inode 130(1) in in-core inode list 125 for clarity).

Figure 1B:
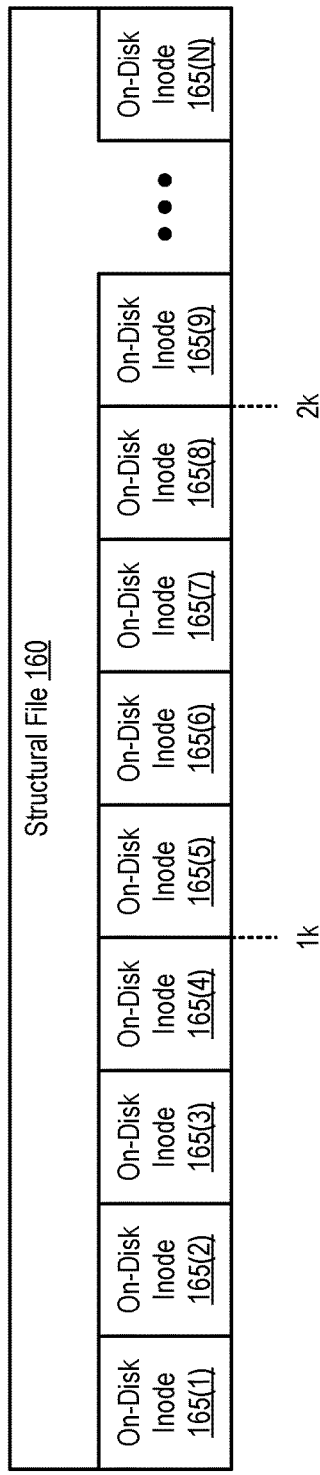
FIG. 1B is a block diagram of a structural file, according to one embodiment of the present disclosure.
Figure 1C:
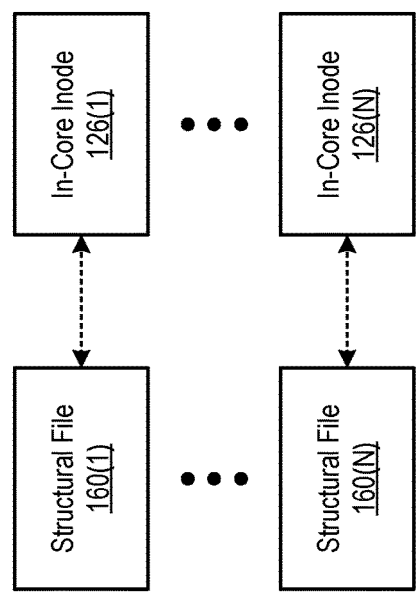
FIG. 1C is a block diagram of a structural file and an in-core inode, according to one embodiment of the present disclosure.

FIG. 1B is a block diagram 100B of a structural file, and FIG. 1C is a block diagram 100C of structural files and in-core inodes, according to some embodiments. A directory in file system 155 includes a list of tuples (e.g., <file name, inode number of the file>). Inode list 175 is one example of such a list of tuples in file system 155. The data portion of on-disk inode 165(1) includes <file1, on-disk inode 165(2)>, <file2, on-disk inode 165(3)>, <file3, on-disk inode 165(4)>, and <dir1, on-disk inode 165(5)>. As shown in FIG. 1B, these "on-disk" inodes are maintained as data of structural file 160 (e.g., an iList file). Because structural file 160 is also a file, structural file 160 also has its own inode with a unique inode number. As shown in FIG. 1C, when structural file 160(1) is brought in-core (e.g., into memory 115), an in-core inode is created for structural file 160(1) (e.g., in-core inode 126(1) in an in-core inode list such as in-core inode list 125). Each structural file and on-disk inode has an associated in-core inode.

Figure 2A:
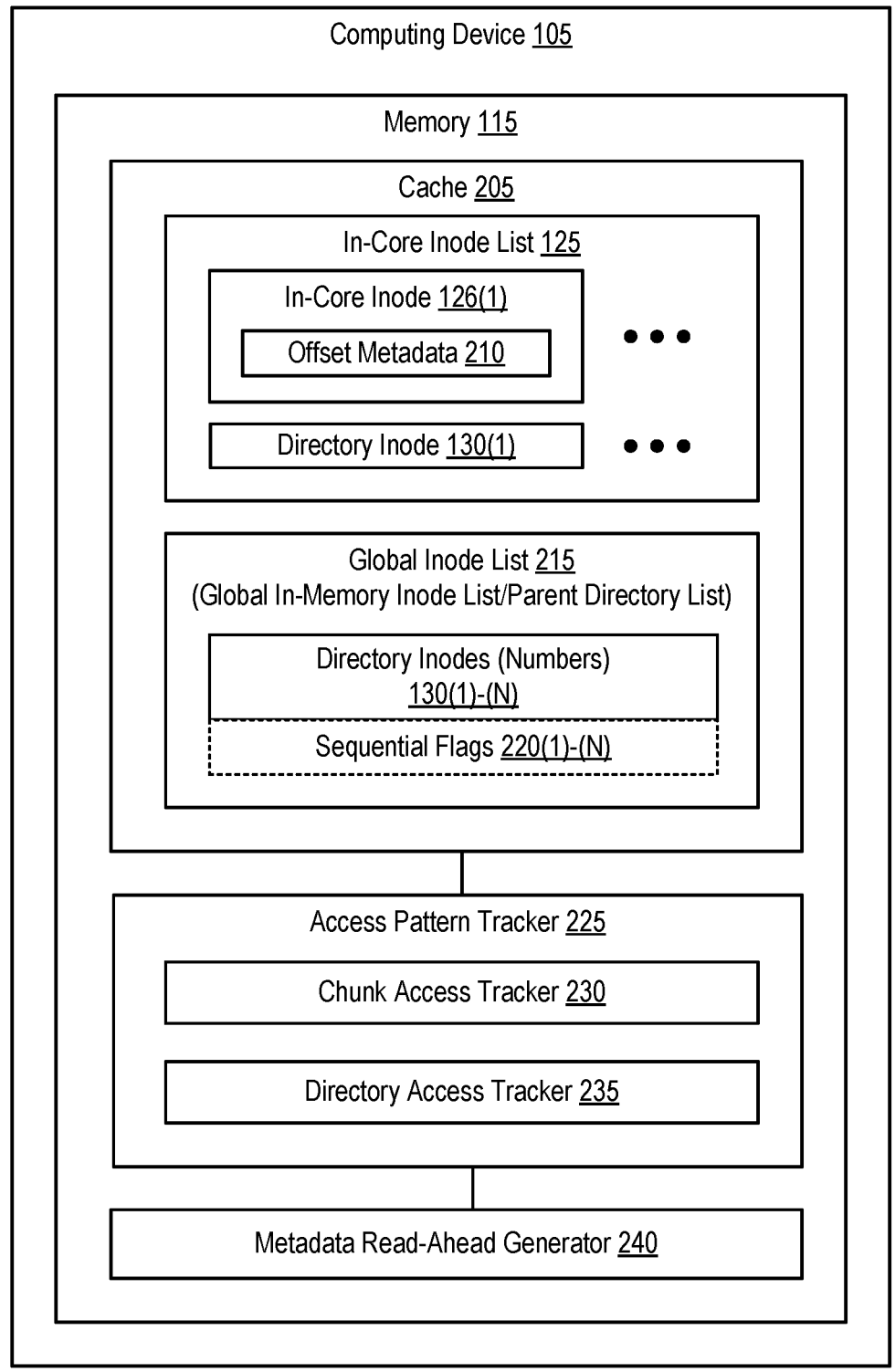
FIG. 2A is a block diagram of a system that tracks access patterns of inodes and issues metadata read-ahead instructions, according to one embodiment of the present disclosure.

FIG. 2A is a block diagram of a computing system 200A that tracks access patterns of inodes and issues metadata read-ahead instructions, according to one embodiment. As shown in FIG. 2A, computing device 105 includes memory 115. Memory 115 implements a cache 205, an access pattern tracker 225, and a metadata read-ahead generator 240. Cache 205 implements global inode list 215, which includes one or more entries from in-core inode list. In-core inode 126(1) is an in-memory data structure (or list) that is created for structural file 160(1).

In-core inode 126(1) includes offset metadata 210. Global inode list 215 is a global in-memory inode list. Offset metadata 210 includes location information of on-disk inode access patterns, and global inode list 215 (also called parent directory list) includes directory inodes 130(1)-(N) (e.g., in-core parent directory inode numbers of on-disk inodes) and sequential flags 220(1)-(N). Sequential flags 220(1)-(N) can be stored as part of in-core inodes for parent directories (e.g., parent directories identified in memory by in-core parent directory inode numbers and shown as directory inodes 130(1)-(N) in FIG. 2A). Access pattern tracker 225 includes a chunk access tracker 230 (e.g., to track chunk access of on-disk inodes), and a directory access tracker (e.g., to track sequential and non-sequential access of on-disk inodes in directories). The foregoing elements of FIG. 2A are described in greater detail in connection with FIGS. 2B-2E.

Example of Tracking Chunk Access Pattern of Modes

FIG. 2B is a block diagram 200B of offset metadata, according to one embodiment. Offset metadata 210 includes an end offset of a last read metadata chunk 245 and a starting offset of a current metadata read operation 250. Because file system 155 persistently stores in-core inodes 165(1)-(N) on disk 150, when a particular inode is not found in-core (e.g., in cache 205), chunk access tracker 230, which is part of access pattern tracker 225, reads on-disk inodes in structural file 160 from disk 150 in chunks (e.g., 1 KB, 2 KB, 4 KB, or other appropriate size). In this manner, chunk access tracker 230 can be configured to track access patterns of chunks of metadata (e.g., on-disk inodes), and facilitate a determination as to whether an application (e.g., application 135 or application 140) is accessing on-disk inodes in a sequential (or nearly-sequential) manner.

In one embodiment, chunk access tracker 230 determines a location of a unit of metadata (e.g., the location/end offset of a 1 KB chunk of on-disk inodes 165(1)-(4) as shown in FIG. 1B), in a metadata storage area (e.g., in structural file 160). Chunk access tracker 230 determines another location (e.g., a starting offset) in the metadata storage area (e.g., in structural file 160) that corresponds to a current metadata read operation. Metadata read-ahead generator 240 then determines whether a metadata read-ahead operation is needed using the location of the data chunk and the another location that corresponds to the current metadata read operation. If the metadata read-ahead operation is needed, metadata read-ahead generator 240 issues the metadata read-ahead operation.

Chunk access tracker 230 maintains the end offset of the last read metadata chunk 245 from disk 150 in in-core inode 126(1) associated with structural file 160(1) (e.g., the end of a logical offset in structural file 160(1)). For example, if application 135 and/or application 140 attempt to access data 180 in disk 150 that causes (and requires) the reading of a 1 KB chunk of on-disk inodes, then chunk access tracker 230 stores the end offset of the 1 KB chunk of on-disk inodes (e.g., the end offset of the 1 KB chunk of on-disk inode 165(1)-(4) as shown in FIG. 1B) in in-core inode 126(1) of structural file 160(1) as a "stored value."

In some embodiments, if the starting offset of the current metadata read operation 250 (e.g., on-disk inode 165(5) as shown in FIG. 1B) is adjacent to the stored value (e.g., the end offset of on-disk inodes 165(1)-(4)—the end offset of the last read metadata chunk 245), metadata read-ahead generator 240 issues a metadata read-ahead instruction to fetch the on-disk inodes from 1 KB to 2 KB in structural file 160 (e.g., on-disk inodes 165(5)-(8) as shown in FIG. 1B) into cache 205. Because chunk access tracker 230 determines that on-disk inode access is happening in a sequential manner, metadata read-ahead generator 240 issues a metadata read-ahead instruction to fetch the next 1 KB chunk of on-disk inodes from disk 150 to in-core inode list 125 (e.g., 1 KB to 2 KB), thus accelerating (future) inode access.

If the metadata read-ahead instruction described above is triggered (e.g., if the starting offset of the current metadata read operation 250 is next to the end offset of the last read metadata chunk 245), then access pattern tracker 225 updates the stored value (e.g., the end offset of on-disk inodes 165(1)-(4)—the end offset of the last read metadata chunk 245) in in-core inode list 125 by replacing the stored value in cache 205 with another end offset of another last read metadata chunk, read by the metadata read-ahead operation (e.g., the end offset of on-disk inodes 165(5)-(8) (e.g., at 2 KB) as shown in FIG. 1B, because the metadata read-ahead operation reads ahead on-disk inodes from 1 KB to 2 KB as a result of the (issued) metadata read-ahead instruction). However, if the starting offset of the current metadata read operation 250 is not next to the end offset of the last read metadata chunk 245, and thus no metadata read-ahead is triggered, access pattern tracker 225 resets the stored value (e.g., the end offset of on-disk inodes 165(1)- (4)—the end offset of the last read metadata chunk 245) with an end offset of the current metadata read operation.

It will be appreciated that chunk access pattern(s) of inodes can be tracked and metadata read-ahead instructions and/or metadata read-ahead operations can be issued to pre-fetch applicable inodes from disk into memory to accelerate the subsequent access of these inodes. Described next are methods, systems, and processes to track inode access pattern(s) for inodes that are part of directories.

Example of Using a Parent Directory List to Track Access Pattern of Modes

It will be appreciated that an inode allocation policy can maintain on-disk inodes in proximity to each other within the same directory, referred to herein as proximate locality. For example, the on-disk inodes of files that are accessed frequently and together can be maintained within the same directory. This proximate locality of on-disk inodes in directories can be used to track directory access of inodes. For example, global inode list 215 (or parent directory list) can be created and maintained to track access of on-disk inodes.

FIG. 2C is a table 200C illustrating the contents of such a global inode list, and FIG. 2D is a block diagram 200D of directory access tracker 235 that uses a global inode list, according to certain embodiments. Global inode list 215 (which is a parent directory list for directories 265(1)-(N)) includes a directory inode field 255 and a sequential flag field 260. Global inode list 215 is created and maintained in memory, and includes directory inodes 130(1)-(N) and sequential flags 220(1)-(N). Sequential flags can be stored as part of in-core inodes for parent directories. Directory access tracker 235 includes a sequential directory access tracker 270 and a non-sequential directory access tracker 275.

In one embodiment, an application accesses an inode (e.g., on-disk inode 165(4)). Directory access tracker 235 determines the parent directory of the inode (e.g., directory 265(1)), and whether an entry for the directory exists in global inode list 215. If the entry for the directory exists in global inode list 215, directory access tracker 235 determines whether a file structure of the directory is sequential or non-sequential (e.g., by determining whether the on-disk inodes in that directory are listed, and thus being accessed, in a sequential or non-sequential manner). If the entry for the directory does not exist in global inode list 215, directory access tracker 235 adds a new entry for the parent directory inode in global inode list 215. It should be noted that as shown in FIGS. 1A, 2A, 2C and 3C, directory inodes (e.g., directory inodes 130(1)-(N)) are simply directory-specific representations of on-disk inodes that represent parent directories (e.g., instead of individual files). For example, directory inode 130(1) is an in-memory data structure that represents a parent directory of one or more on-disk inodes.

To track sequential directory access of on-disk inodes, sequential directory access tracker 270 first finds a parent directory of a given on-disk inode (e.g., finds the parent directory's inode number). For example, if on-disk inode 165(4) is read from disk 150, sequential directory access tracker 270 finds a parent directory of on-disk inode 165(4) (e.g., directory inode 130(1)). Sequential directory access tracker 270 then searches global inode list 215 for an entry of the parent directory (inode) of a given on-disk inode (e.g., whether the parent directory inode number is present in cache 205).

If the entry of the parent directory (inode) exists in global inode list 215, sequential directory access tracker 270 checks global inode list 215 to determine whether the parent directory has a sequential flag set (e.g., directory inode 130(1), which in this case, is the parent directory inode number, and has the sequential flag set as shown in FIG. 2C). If the sequential flag is set, metadata read-ahead generator 240 issues a metadata read-ahead instruction (e.g., to fetch all remaining on-disk inodes in directory 265(1) because the on-disk inode access is sequential). If sequential directory access tracker 270 does not find the entry of the parent directory in global inode list 215, sequential directory access tracker 270 adds a new entry of the parent directory's inode number to global inode list 215.

To track non-sequential directory access of on-disk inodes, non-sequential directory access tracker 275 first finds a parent directory of a given on-disk inode (e.g., the parent directory's inode number). Non-sequential directory access tracker 275 then searches global inode list 215 for an existing entry of the parent directory (e.g., whether the parent directory inode number is present in cache 205). If the entry of the parent directory exists in global inode list 215, non-sequential directory access tracker 275 fetches (or retrieves) an inode list of the parent directory (e.g., a portion or a part of inode list 175 applicable to the parent directory in question) from disk 150 into cache 205, and metadata read-ahead generator 240 issues a metadata read-ahead instruction for the on-disk inodes listed on the retrieved inode list (e.g., on-disk inodes that are associated with and part of the parent directory). If the entry of the parent directory does not exist in global inode list 215, non-sequential directory access tracker 275 adds a new entry of the parent directory's inode number to global inode list 215.

Example of Issuing Metadata Read-Ahead Instructions for Modes

FIG. 2E is a block diagram 200E of a metadata read-ahead generator, according to one embodiment. Metadata read-ahead generator 240 is implemented by computing device 105 and stores an issued metadata read-ahead value 280 and an asynchronous metadata read-ahead instruction 285, and includes queue generator 290. Although directory access tracker 235 identifies one or more on-disk inodes to pre-fetch, if these on-disk inodes are not pre-fetched, I/O operations associated with these on-disk inodes cannot be completed.

Therefore, in one embodiment, metadata read-ahead generator 240 intercepts a command to read on-disk inodes in response to an I/O operation (e.g., a read operation or a write operation). An I/O operation to access data can result in (or cause) a command to access and read on-disk inode(s) (e.g., metadata) associated with that data (e.g., to determine when and how the requested data has been modified, and the like). Metadata read-ahead generator 240 analyzes issued metadata read-ahead value 280 in the metadata read-ahead operation by comparing issued metadata read-ahead value 280 and a chunk total in the command.

Issued metadata read-ahead value 280 includes all the on-disk inodes that should be read ahead (e.g., detected based on sequential/near-sequential chunk access, and/or sequential or non-sequential access of on-disk inodes in directories). A chunk total is the total number of chunks of on-disk inodes to be read ahead (e.g., represented as an integer "N" herein for discussion purposes). For example, chunk access tracker 230 and sequential directory access tracker 270 can identify and determine that a 1 KB chunk of on-disk inodes (e.g., on-disk inodes 165(1)-(4)) or a 2 k chunk of on-disk inodes (e.g., on-disk inodes 165(1)-(8)) must be read-ahead (e.g., based on sequential/near-sequential chunk access, and/or sequential or non-sequential access of on-disk inodes in directories). However, as discussed above, non-sequential directory access tracker 275 can identify several non-sequential on-disk inodes (e.g., that can be part of various disparate chunks) to read ahead (e.g., as shown in the case of directory 265(2) in FIG. 3B). Therefore, it will be appreciated that in certain scenarios, issued metadata read-ahead value 280 may or may not be equal to N.

In some embodiments, based on comparing issued metadata read-ahead value 280 and the chunk total in the command, metadata read-ahead generator 240 either waits for the I/O operation to complete, or issues asynchronous metadata read-ahead instruction 285. If the I/O operation is complete, queue generator 290 generates a queue and includes the remaining chunks of metadata of the chunk total not included in asynchronous metadata read-ahead instruction 285. However, if the I/O operation is incomplete, queue generator 290 updates the chunk total in the metadata read-ahead operation.

For example, a command (or call) to read an on-disk inode which goes to disk 150 is intercepted after an I/O operation is issued (e.g., by application 130). This command triggers the inode access pattern detection methods described above (e.g., sequential/near-sequential chunk access, and/or sequential or non-sequential access of on-disk inodes in directories). If the inode access pattern detection methods do not trigger a read-ahead of on-disk inodes, metadata read-ahead generator 240 simply waits for the I/O operation to complete. However, if the inode access pattern detection methods do trigger a read-ahead of on-disk inodes, metadata read-ahead generator 240 determines whether the total issued metadata read ahead (e.g., issued metadata read-ahead value 280) is less than or equal to N (e.g., the total number of chunks of on-disk inodes to be read ahead).

If the total issued metadata read ahead is less than or equal to N, metadata read-ahead generator 240 issues asynchronous metadata read-ahead instruction 285 with the next chunk of the asynchronous metadata read (e.g., the next chunk in issued metadata read-ahead value 280 after N). If the original I/O operation is complete, queue generator 290 generates a separate thread which issues asynchronous metadata read-ahead instruction 285 with the remaining chunks of the asynchronous metadata read (e.g., the remaining chunks in issued metadata read-ahead value 280 after N). If the original I/O operation is not complete, metadata read-ahead generator 240 increments a counter for issued metadata read-ahead value 280, determines whether issued metadata read-ahead value 280 is equal to N, and waits for the original I/O operation to complete.

It will be appreciated that metadata read-ahead detection and the issuing of asynchronous metadata read-ahead instructions is performed in the context of the blocking thread, while the original I/O operation is waiting to complete in the background. These methodologies decrease inode access pattern detection overhead on system performance, and also avoid the creation and scheduling of separate threads, which can delay the availability of blocks for subsequent reads.

Example of Tracking Sequential and Non-Sequential Directory Access Pattern of Modes FIG. 3A is a block diagram of a directory with a sequential inode structure 300A, FIG. 3B is a block diagram of a directory with a non-sequential inode structure 300B, and FIG. 3C is a block diagram of a cache 300C that implements a global inode list (e.g., a parent directory list or a global in-memory inode list), according to some embodiments. It will be appreciated that a listing of directories is first performed by an application (e.g., by application 135, application 140, or some other application). During the listing of directories, on-disk inode numbers associated with each directory entry are returned. If the on-disk inode numbers within a given directory are sequential (e.g., directory 265(1) as shown in FIG. 3A), then sequential directory access tracker 270 sets a sequential flag for that particular directory in the in-core inode of that directory (e.g., a sequential flag for directory 265(1) is set in global inode list 215 as shown in FIGS. 2C and 3C).

For example, because the on-disk inodes of directory 265(1) are sequential (e.g., on-disk inodes 165(4)-(9) are listed sequentially), sequential directory access tracker 270 sets a sequential flag in directory inode 130(1) (e.g., in an in-core inode) for directory 265(1) (e.g., indicated by "1" in sequential flag field 260 of global inode list 215 in FIGS. 2C and 3C). On the contrary, because the on-disk inodes of directory 265(2) are non-sequential (e.g., on-disk inodes 165(4), 165(9), 165(15), 165(11), 165(19), and 165(6) are listed non-sequentially), non-sequential directory access tracker 275 does not set a sequential flag in directory inode 130(2) (e.g., in an in-core inode) for directory 265(2)) (e.g., indicated by "0" in sequential flag field 260 of global inode list 215 in FIGS. 2C and 3C).

As previously noted, a metadata read-ahead instruction to perform a metadata read-ahead operation can be issued after a listing of a directory is performed. In one embodiment, an application performs the listing of directories that are part of disk 150. For example, a listing of directory 265(2) as shown in FIG. 3B, returns file 315(1) with on-disk inode 165(4), file 315(2) with on-disk inode 165(9), file 315(3) with on-disk inode 165(15), file 315(4) with on-disk inode 165(11), file 315(5) with on-disk inode 165(19), and file 315(6) with on-disk inode 165(6). In this scenario, directory access tracker 235 creates and maintains an in-memory data structure (e.g., an in-memory inode list) that includes a list of the foregoing inode numbers (e.g., on-disk inodes 165(4), 165(9), 165(15), 165(11), 165(19), and 165(6)), and associates this in-memory inode list with the in-core inode of directory 265(2) (e.g., directory inode 130(2)).

For example, if application 130 accesses file 315(1), and hence there is a need to access and read on-disk inode 165(4), non-sequential directory access tracker 275 reads on-disk inode 165(4) from disk 150, and determines that the parent directory inode number of on-disk inode 165(4) is directory inode 130(2). Non-sequential directory access tracker 275 then checks if directory inode 130(2) is present in cache 205, as shown in FIG. 3C. If directory inode 130(2) is not present in cache 205, non-sequential directory access tracker 275 adds directory inode 130(2) (e.g., indicated by bold in FIGS. 2C and 3C) to cache 205.

Next, if application 130 accesses file 315(2), and thus accesses and reads on-disk inode 165(9) from disk 150, non-sequential directory access tracker 275 determines that the parent directory inode number of on-disk inode 165(9) is also directory inode 130(2). Because directory inode 130(2) has been added to cache 205, metadata read-ahead generator 240 determines that the remaining files (e.g., files 315(3)-(6)) under directory 265(2) can be read ahead. Metadata read-ahead generator 240 then accesses the in-memory inode list and identifies the remaining on-disk inode numbers associated with files 315(3)-(6) (e.g., on-disk inodes 165(15), 165(11), 165(19), and 165(6)), and generates a metadata read-ahead instruction that performs a metadata read-ahead operation to fetch on-disk inodes 165(15), 165(11), 165(19), and 165(6) from disk 150 to memory 115.

It will be appreciated that directory access tracker 235 tracks chunk access pattern(s) of on-disk inodes, as well as sequential and non-sequential access pattern(s) of on-disk inodes that are part of directories, to identify on-disk inodes that are candidates for a metadata read-ahead operation that accelerates inode and data access.

Figure 4A:
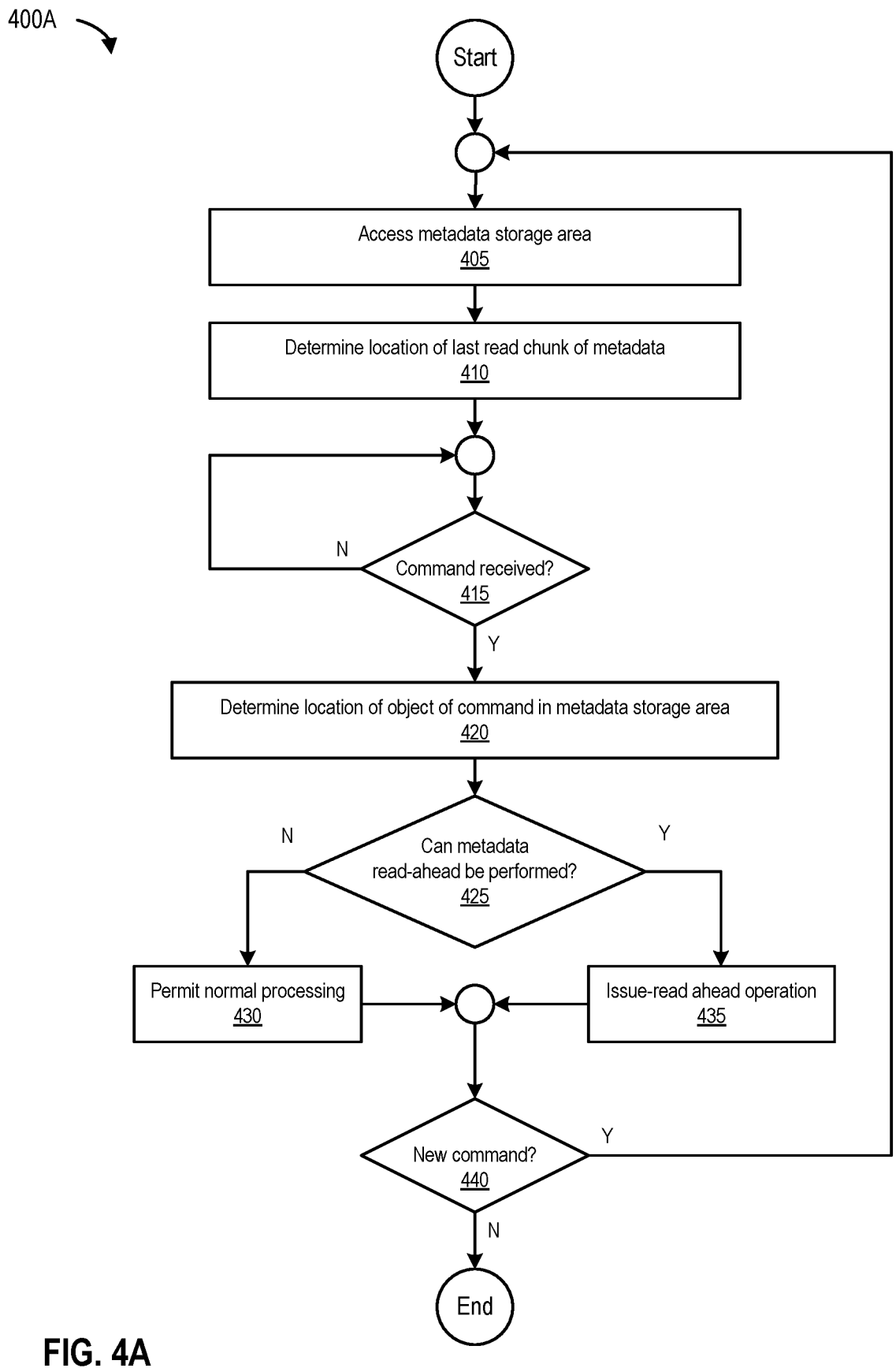
FIG. 4A is a flowchart that illustrates a process for performing inode pre-fetching, according to one embodiment of the present disclosure.

Processes to Track Inode Access Pattern(s) and Issue Metadata Read-Ahead Instructions FIG. 4A is a flowchart 400A that illustrates a process for issuing a read-ahead instruction to pre-fetch on-disk inodes from disk to memory, according to one embodiment. The process begins at 405 by accessing a metadata storage area (e.g., structural file 160). At 410, the process determines the location of a last read chunk of metadata (e.g., end offset of last read metadata chunk 245). At 415, the process determines if a command (or call) (e.g., to read on-disk inodes) has been received. If no command has been received yet, the process loops back to 415. However, if a command has been received, the process, at 420, determines the location of an object of the command in the metadata storage area (e.g., starting offset of current metadata read operation 250).

At 425, the process determines whether a metadata read-ahead can be performed (or whether a metadata read-ahead is required or feasible). If a metadata read-ahead cannot be performed, the process, at 430, permits normal processing (e.g., no metadata read-ahead operation is performed and on-disk inodes are not pre-fetched from disk into memory). However, if a metadata read-ahead can be performed (and/or is needed and/or feasible), the process, at 435, issues a metadata read-ahead operation (or issues a metadata read-ahead instruction, e.g., using metadata read-ahead generator 240, that causes computing device 105 to perform a metadata read-ahead operation to fetch chunk(s) of on-disk inodes from disk into memory). At 440, the process determines if there is a new command (e.g., to access and/or read on-disk inodes). If there is a new command to access and/or read on-disk inodes, the process loops back to 405. Otherwise, the process ends.

Figure 4B:
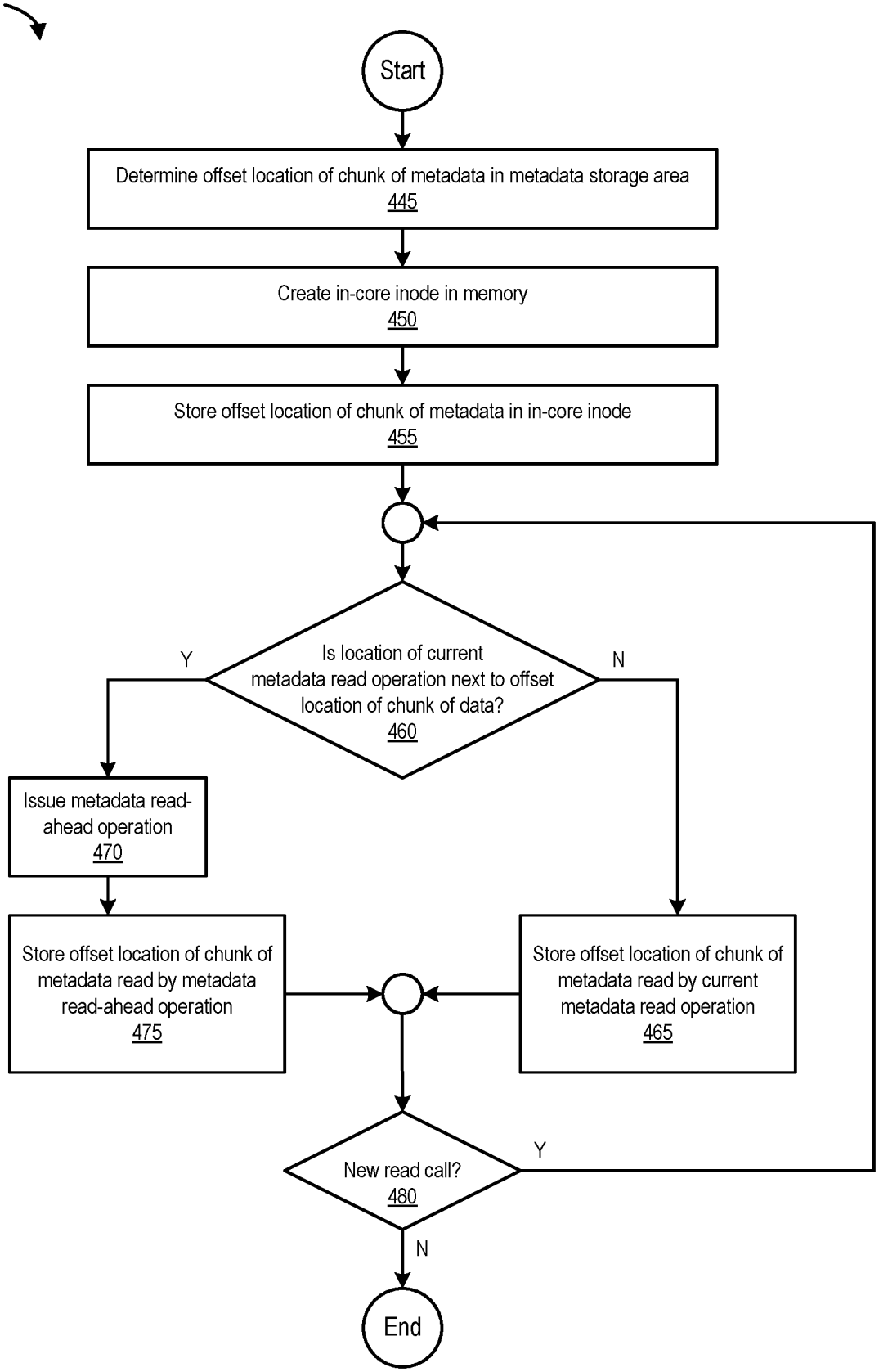
FIG. 4B is a flowchart that illustrates a process for storing offset metadata associated with on-disk inodes, according to one embodiment of the present disclosure.

FIG. 4B is a flowchart 400B that illustrates a process for storing offset metadata associated with on-disk inodes, according to one embodiment. The process begins at 445 by determining an offset location of a chunk of metadata (e.g., end offset of last read metadata chunk 245) in a metadata storage area (e.g., structural file 160). At 450, the process creates an in-core inode (e.g., in-core inode list 125) in memory (e.g., memory 115), and at 455, the process stores the offset location of the chunk of metadata in the in-core inode.

At 455, the process determines whether a location of a current metadata read operation (e.g., starting offset of current metadata read operation 250) is next to (or adjacent to) the offset location of the chunk of metadata. If the location of the current metadata read operation is not next to the offset location of the chunk of metadata, the process, at 465, stores an offset location of a chunk of metadata read by the current metadata read operation (e.g., an end offset of the current metadata read operation). However, if the location of the current metadata read operation is next to the offset location of the chunk of metadata, the process, at 470, issues a metadata read-ahead operation (or issues a metadata read-ahead instruction), and at 475, stores an offset location of a chunk of metadata read by the metadata read-ahead operation. At 480, the process determines whether there is a new read call (e.g., a command to read on-disk inodes caused by an application I/O operation). If there is a new read call to read on-disk inodes, the process loops back to 460. Otherwise, the process ends.

It will be appreciated that the processes illustrated in flowchart 400A of FIG. 4A and flowchart 400B of FIG. 4B are examples of tracking the chunk access patterns of on-disk inodes. Because on-disk inodes are persistently stored on disk (e.g., disk 150), chunk access tracker 230 can access structural file 160 to determine the end offset of a last read metadata chunk as well as the starting offset of a current metadata read operation. Because chunk access tracker 230 can save this location information, chunk access tracker 230 can determine whether on-disk inodes are being accessed by application 135 or application 140 in a sequential or nearly-sequential manner. Based on this stored location information, on-disk inodes that are likely to be accessed can be read ahead and pre-fetched from disk into memory, thus accelerating subsequent inode access for those on-disk inodes.

Figure 5A:
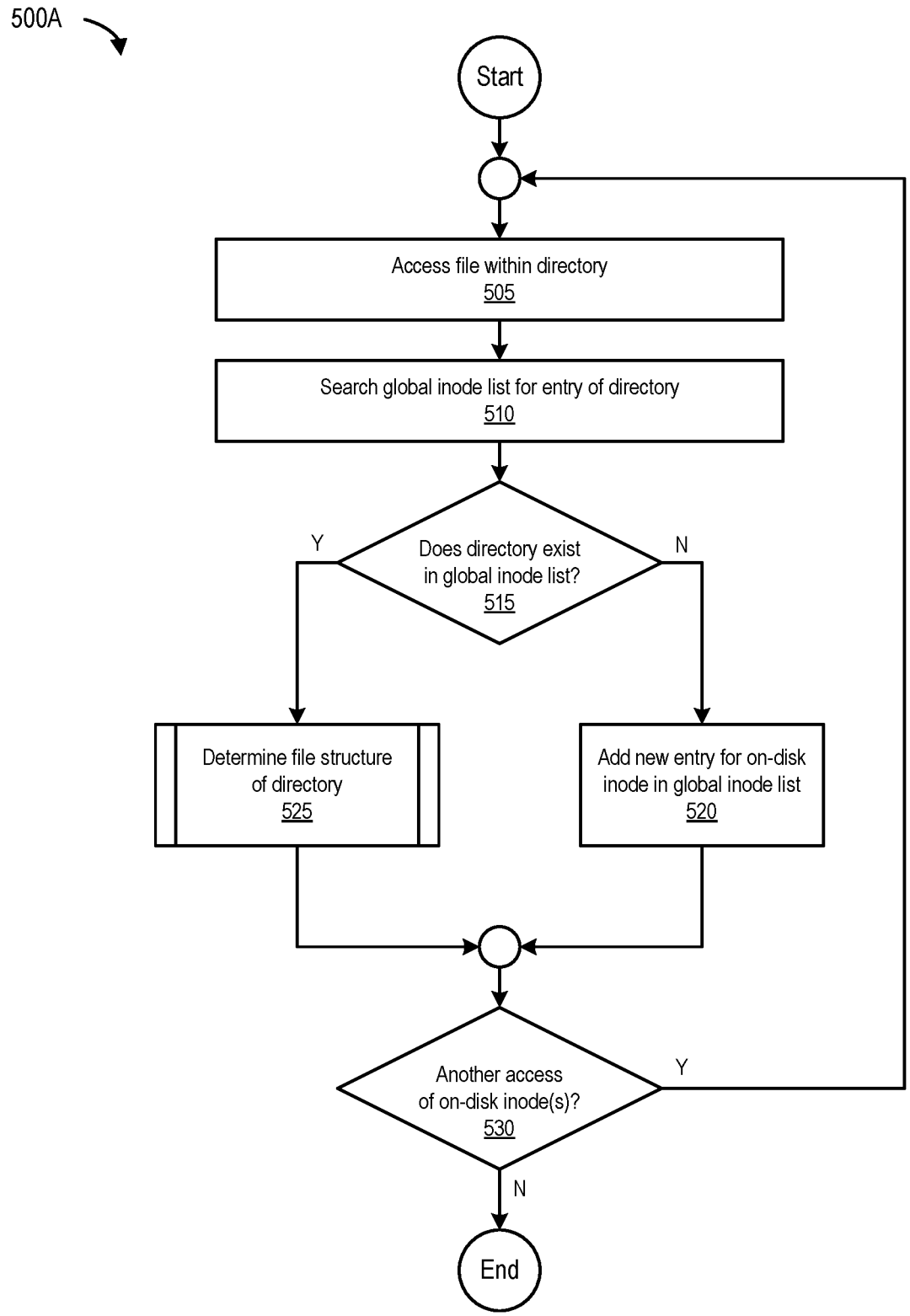
FIG. 5A is a flowchart that illustrates a process for determining the file structure of a directory, according to one embodiment of the present disclosure.

FIG. 5A is a flowchart 500A that illustrates a process for determining the file structure of a directory, according to one embodiment. The process begins at 505 by accessing a file within a directory (e.g., file 135(1) in directory 265(1) as shown in FIG. 3A or file 135(1) in directory 265(2) as shown in FIG. 3B). At 510, the process searches a global inode list for an entry (e.g., an inode number) of the directory. At 515, the process determines whether the directory exists in the global inode list (e.g., whether directory inode 130(1), which is the inode number of directory 265(1), exists and is listed in global inode list 215).

If the directory does not exist in the global inode list, the process, at 520, adds a new entry (e.g., adds a parent directory inode number) for an on-disk inode in the global inode list (e.g., shown with respect to directory 265(3) in FIGS. 2C and 3C). If the directory exists in the global inode list, the process, at 525, determines a file structure of the directory (e.g., whether the on-disk inodes in the directory are listed sequentially or non-sequentially). At 530, the process determines whether there is another access of on-disk inodes. If there is another access of on-disk inodes, the process loops back to 505. Otherwise, the process ends.

Figure 5B:
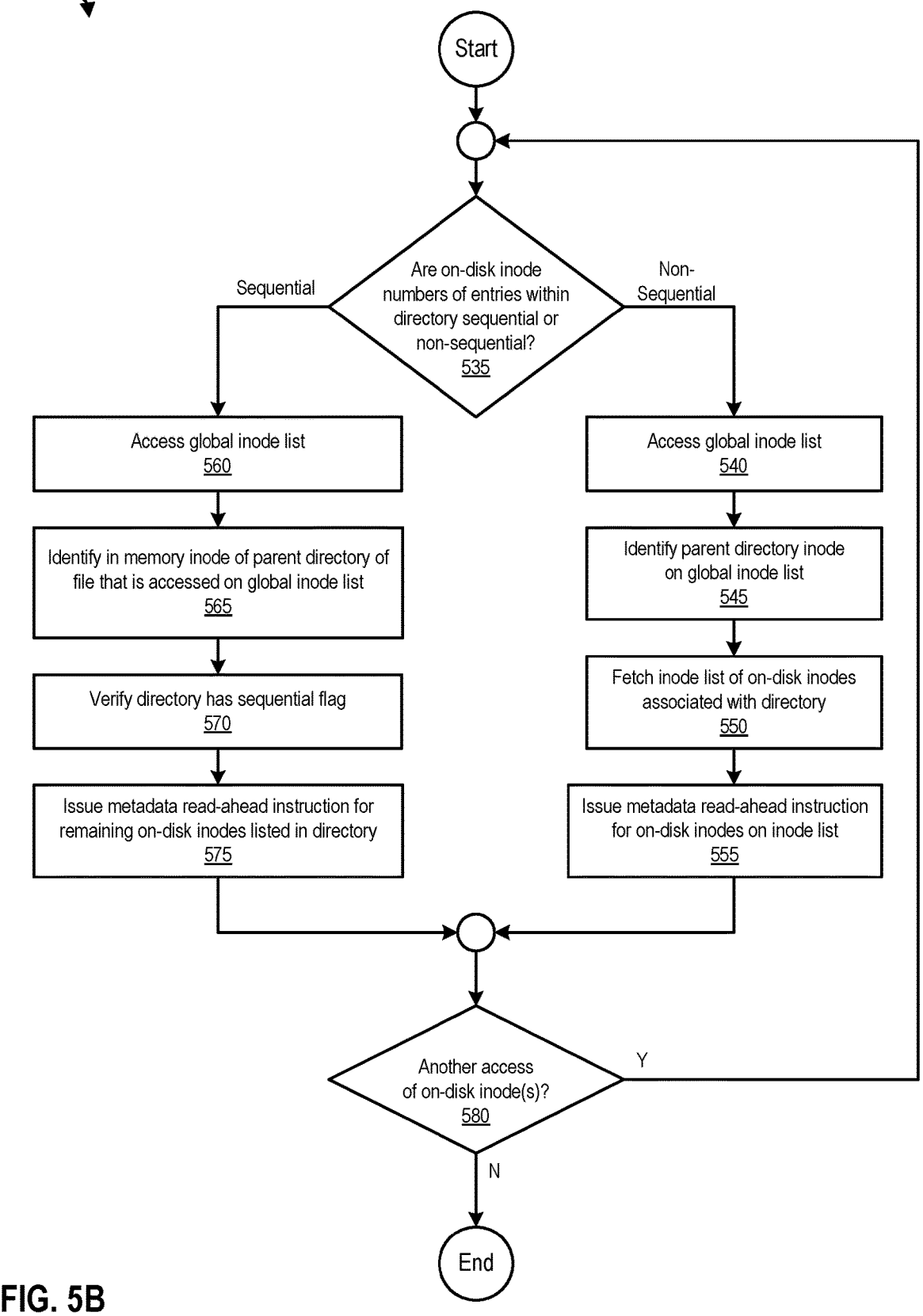
FIG. 5B is a flowchart that illustrates a process for issuing a metadata read-ahead instruction for on-disk inodes, according to one embodiment of the present disclosure.

FIG. 5B is a flowchart 500B that illustrates a process for issuing a metadata read-ahead instruction for on-disk inodes, according to one embodiment. The process begins at 535 by determining whether on-disk inode numbers of entries within a given directory are sequential or non-sequential (e.g., listed sequentially or non-sequentially as the result of performing a listing of the directory). For example, in FIG. 3A, the on-disk inode numbers of entries are listed sequentially, and in FIG. 3B, the on-disk inode numbers of entries are listed non-sequentially.

If the on-disk inode numbers of entries are listed non-sequentially, the process, at 540, access a global inode list (e.g., a parent directory list as shown in FIG. 3C). At 545, the process identifies the parent directory inode on the global inode list (e.g., using the on-disk inode's parent directory inode number). At 550, the process fetches an inode list associated with the directory in question (e.g., from disk 150, or from memory because the inode list can be stored and maintained in memory during the listing process), and at 555, the issues a metadata read-ahead instruction for on-disk inodes on the inode list.

However, if the on-disk inode numbers of entries are listed sequentially, the process, at 560, access the global inode list, and at 565, identifies an in-memory inode of the parent directory of a file that is accessed on the global inode list (e.g., using the on-disk inode's parent directory inode number). At 570, the process verifies that the directory has the sequential flag set, and at 575, issues a metadata read-ahead instruction for the remaining on-disk inodes listed in the directory in question. At 580, the process determines whether there is another access of on-disk inode(s). If there is another access of on-disk inode(s), the process loops back to 535. Otherwise, the process ends.

It will be appreciated that the processes illustrated in flowchart 500A of FIG. 5A and flowchart 500B of FIG. 5B are examples of using a parent directory list to track access pattern(s) of on-disk inodes when directories are involved. As previously noted, an application can perform a listing of one or more directories to determine whether on-disk inodes in a given directory are listed sequentially or non-sequentially. Because directories are typically stored on disk (e.g., disk 150), determining a directory's data and/or file structure each time a file is accessed in a given directory can consume significant computing resources. However, because both access pattern tracker 225 and the parent directory list are part of memory 115, and because the parent directory list maintains a listing of the data and/or file structure of multiple directories, access pattern tracker 225 can simply use the parent directory list to determine whether a given directory's in-core inodes are sequential or non-sequential, without accessing disk 150 each time a file in a given directory is accessed.

Figure 6A:
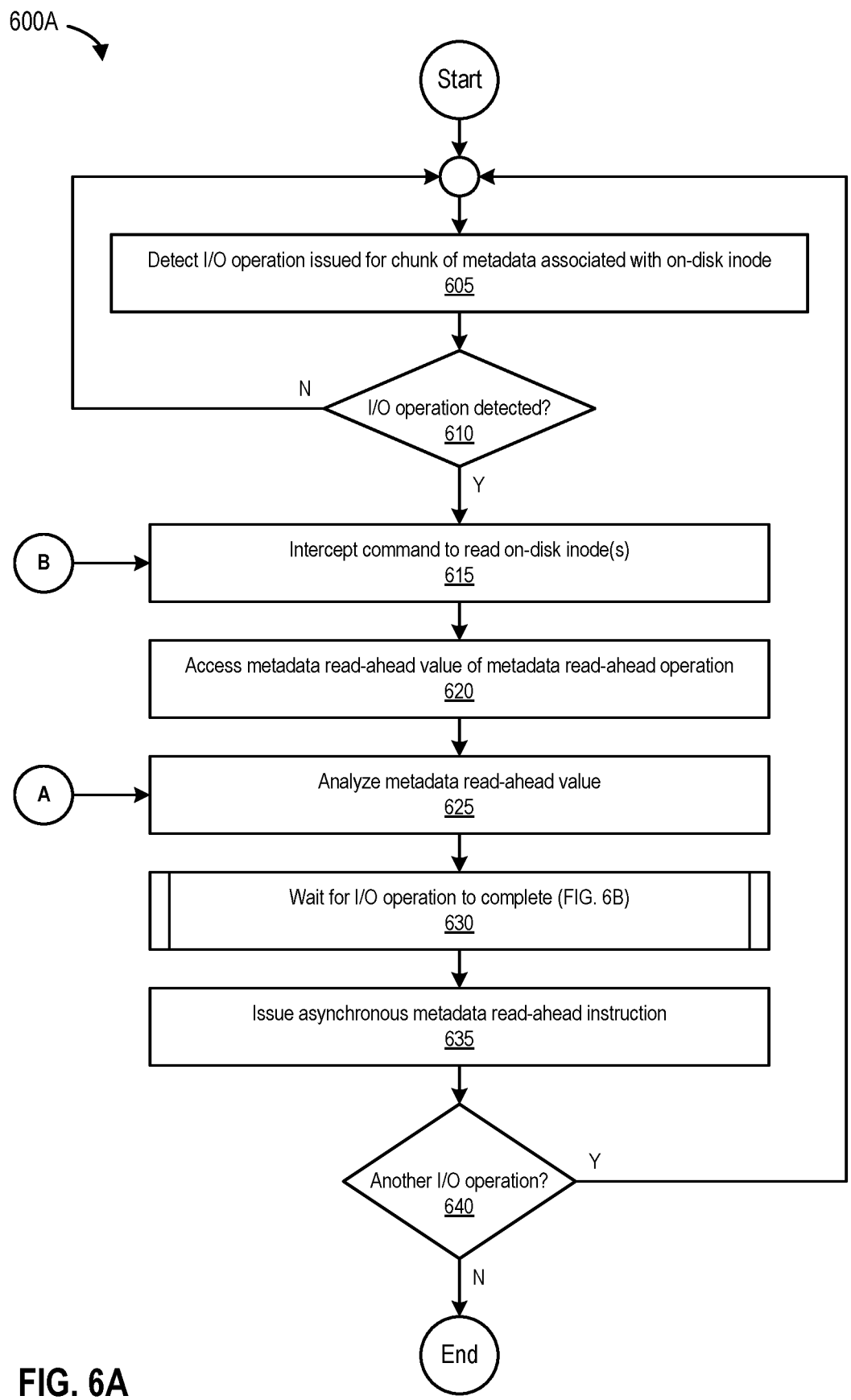
FIG. 6A is a flowchart that illustrates a process for processing input/output (I/O) operations related to inode pre-fetching, according to one embodiment of the present disclosure.

FIG. 6A is a flowchart 600A that illustrates a process for processing input/output (I/O) operations related to pre-fetching inodes, according to one embodiment. The process begins at 605 by detecting an I/O operation issued for a chunk of metadata associated with an on-disk inode (e.g., a unit of metadata in structural file 160). At 610, the process determines whether the I/O operation is detected. If the I/O operation is not detected, the process loops back to 605. However, if the I/O operation is detected, the process, at 615, intercepts a command (or call) to access and/or read on-disk inode(s).

At 620, the process accesses a metadata read-ahead value of the metadata read-ahead operation, and at 625, analyzes the metadata read-ahead value by comparing the (total issued) metadata read-ahead value to the total number of chunks of metadata to be read ahead. At 630, the process waits for the I/O operation to complete, and at 635, issues an asynchronous metadata read-ahead instruction (e.g., using metadata read-ahead generator 240). At 640, the process determines if there is another I/O operation. If there is another I/O operation, the process loops to 605. Otherwise, the process ends.

Figure 6B:
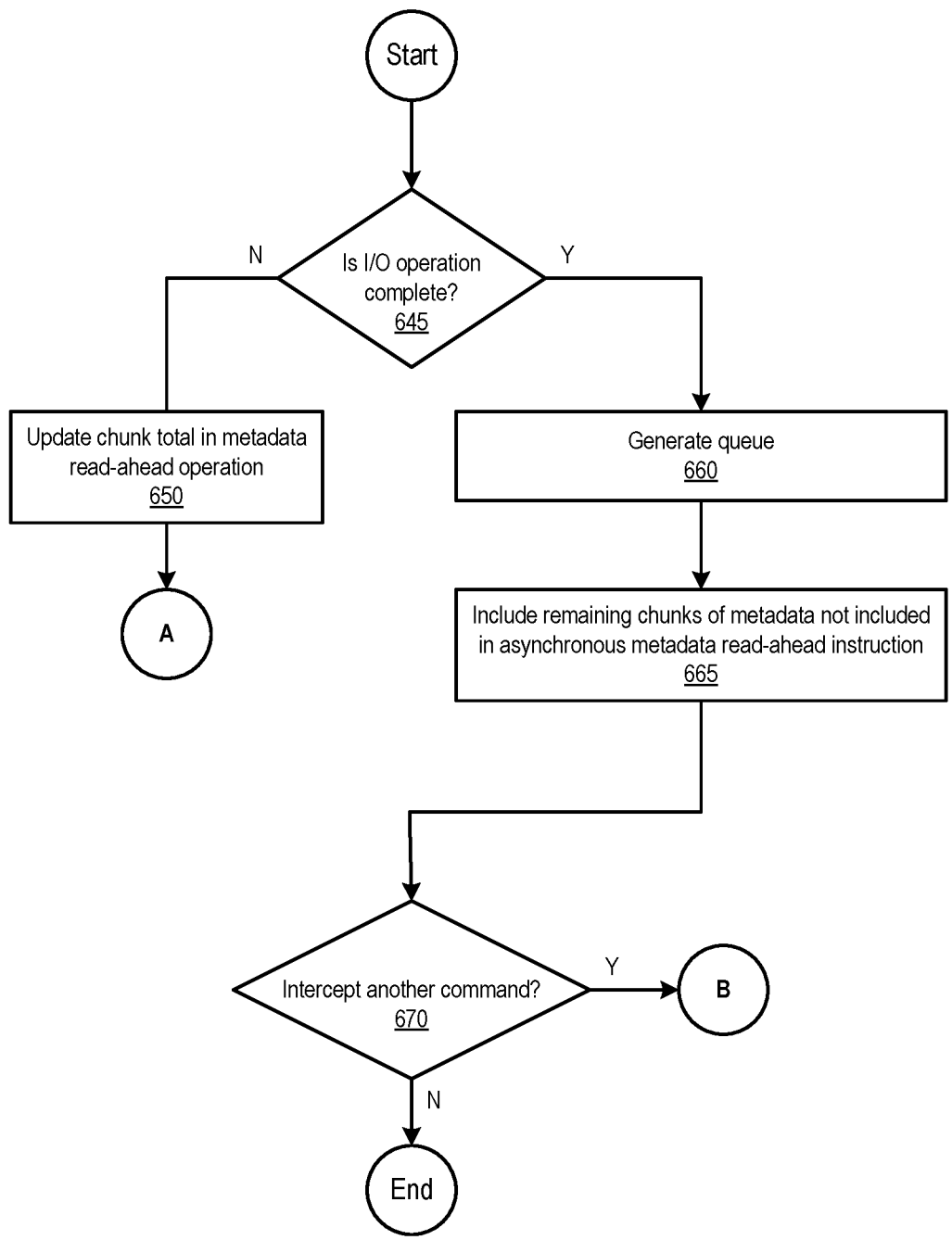
FIG. 6B is a flowchart that illustrates a process for processing I/O operations, related to inode pre-fetching, according to one embodiment of the present disclosure.

FIG. 6B is a flowchart that illustrates a process for processing I/O operations related to pre-fetching inodes, according to one embodiment. The process begins at 645 by determining whether a given I/O operation is complete. If the I/O operation is not complete, the process, at 650, updates a chunk total (e.g., a total number of chunks of metadata to be read-ahead or "N"), and proceeds to 625 (in FIG. 6A). However, if the I/O operation is complete, the process, at 660, generates a queue (e.g., a separate thread), and at 665, issues a metadata read-ahead that includes the remaining chunks of metadata not included in the asynchronous metadata read-ahead instruction (e.g., of FIG. 6A). At 670, the process determines if there is another command (e.g., a call to read on-disk inode(s)) to be intercepted. If there is another command to be intercepted, the process loops back to 615 (in FIG. 6A). Otherwise, the process ends.

It will be appreciated that the processes illustrated in flowchart 600A of FIG. 6A and flowchart 600B of FIG. 6B can be used to identify and pre-fetch on-disk inodes that are part of various disparate chunks of metadata by comparing an issued metadata read-ahead value and a chunk total. Because all or a portion of an inode list can be pre-fetched into memory during a directory listing process, on-disk inodes that are candidates for a metadata read-ahead instruction can be identified in cases where such on-disk are not accessed sequentially. Further, it will also be appreciated that the metadata read-ahead detection and the issuing of asynchronous metadata read-ahead instructions is performed in the context of the blocking thread, while the original I/O operation is waiting to complete in the background. These methodologies decrease inode access pattern detection overhead on system performance, and also avoid the creation and scheduling of separate threads, which can delay the availability of blocks for subsequent reads.

Figure 7A:
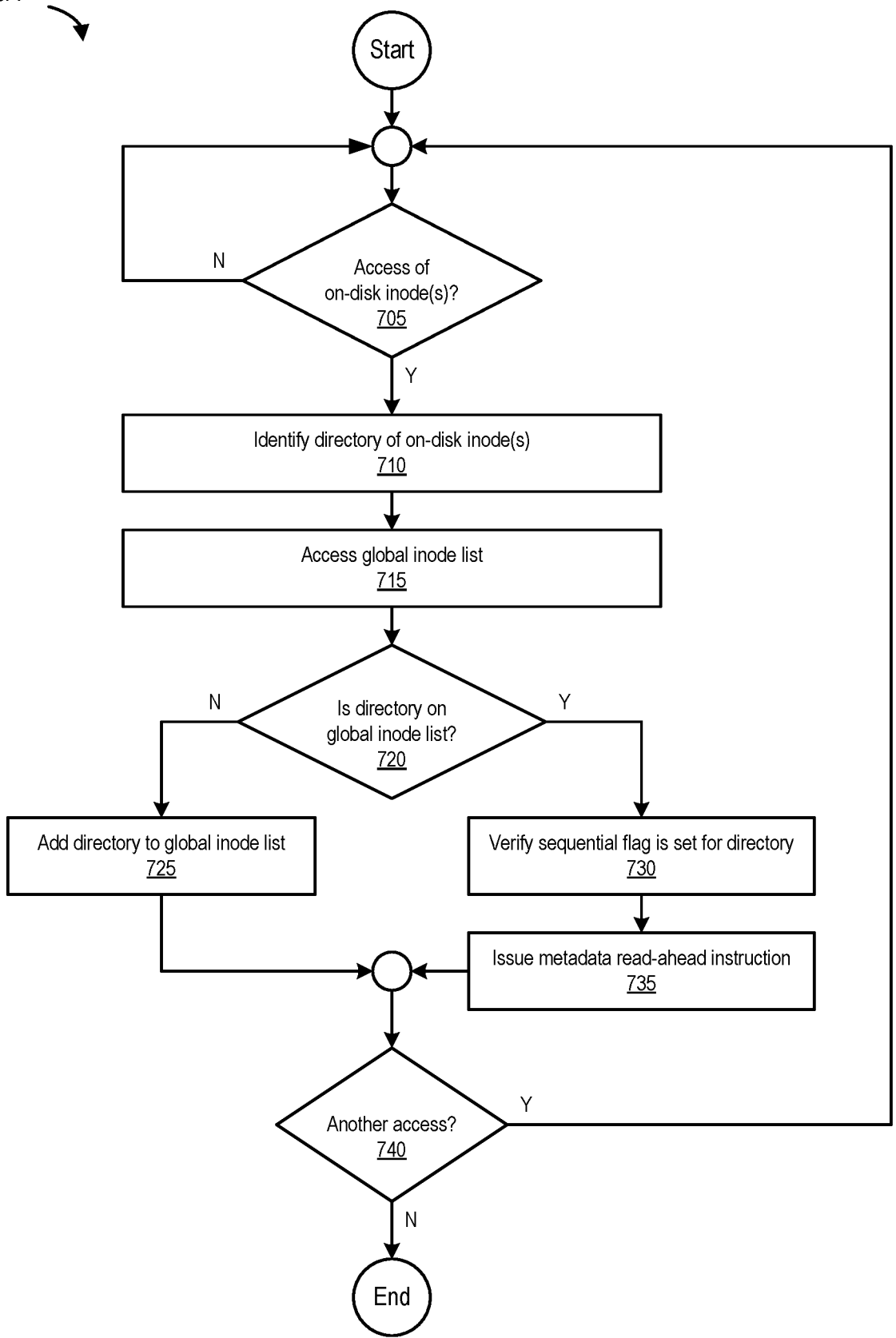
FIG. 7A is a flowchart that illustrates a process for processing access of on-disk inodes, according to one embodiment of the present disclosure.

FIG. 7A is a flowchart that illustrates a process for processing access of on-disk inodes and adding an entry of a directory to a global inode list, according to certain embodiments. The process begins at 705 by determining whether there is an access of on-disk inode(s) (e.g., a read command/call of on-disk inode(s) caused by one or more I/O operations). If there is no access of on-disk inode(s), the process loops back to 705. However, if there is access of on-disk inode(s), the process, at 710, identifies a directory associated with the on-disk inode(s) (e.g., using a parent directory inode number). At 715, the process access a global inode list (e.g., global inode list 215 and/or a parent directory list).

At 720, the process determines whether the directory is on the global inode list (e.g., whether the parent directory inode number of the inode exists on the global inode list). If the directory is not on the global inode list, the process, at 725, adds the directory to the global inode list (e.g., by adding an entry for the parent directory inode number of the inode to the global inode list). However, if the directory is on the global inode list, the process, at 730, verifies that a sequential flag is set for the directory, and at 735, issues a metadata read-ahead instruction (e.g., for the remaining on-disk inodes that are listed in (or part of) the directory). At 740, the process determines whether there is another access (e.g., of on-disk inode(s)). If there is another access, the process loops back to 705. Otherwise, the process ends.

Figure 7B:
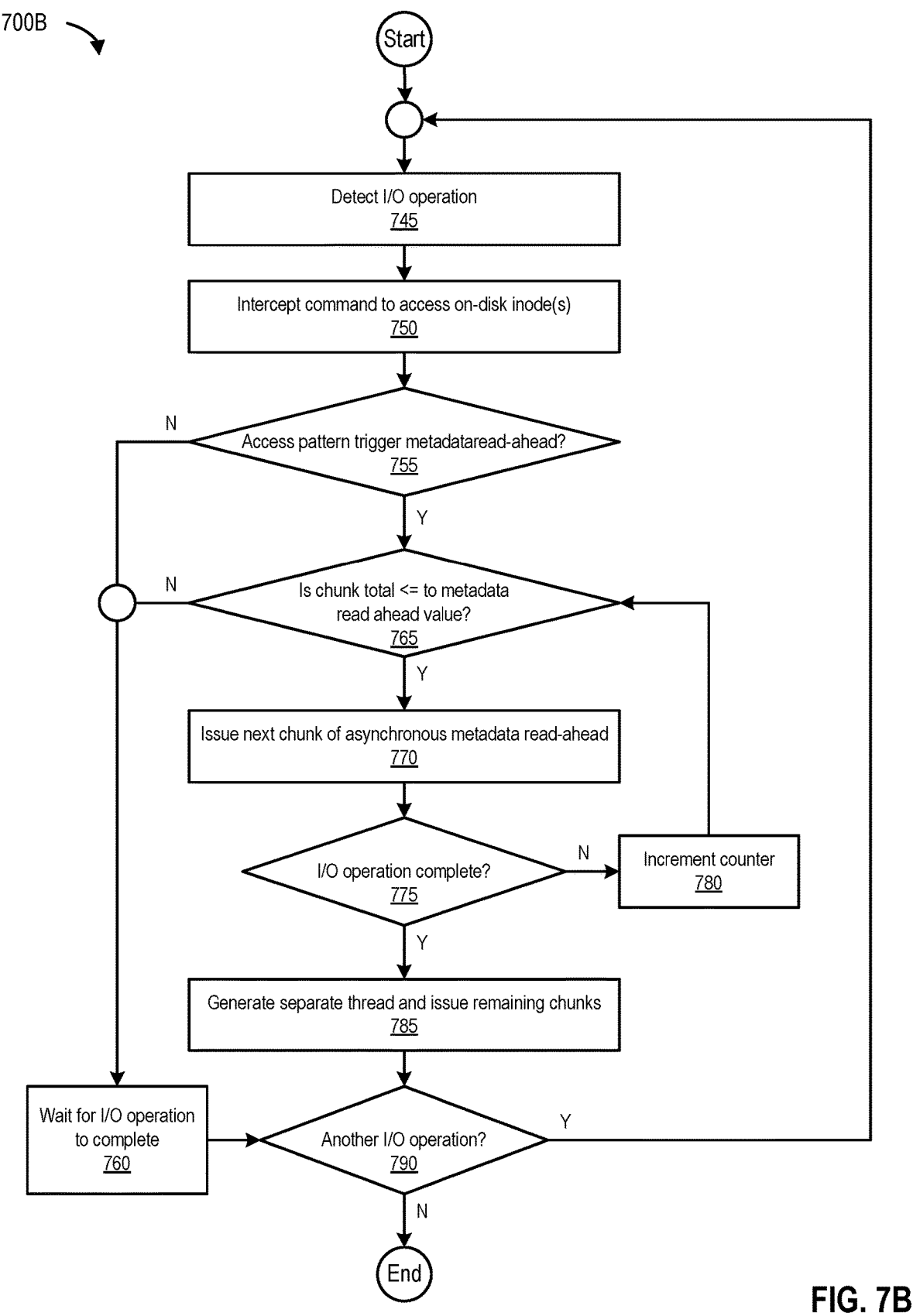
FIG. 7B is a flowchart that illustrates a process for processing a request to access on-disk inodes, according to one embodiment of the present disclosure.

FIG. 7B is a flowchart that illustrates a process for processing a request to access on-disk inodes, according to one embodiment. The process begins at 745 by detecting an I/O operation. At 750, the process intercepts a command (or call) to access (or read) on-disk inode(s). At 755, the process determines whether an on-disk inode access pattern (e.g., detected based on chunk access, and sequential or non-sequential access, among other methodologies) triggers, causes, or results in a metadata read-ahead of the on-disk inode(s). If the on-disk inode access pattern does not trigger the metadata read-ahead (e.g., based on chunk access, sequential access, or non-sequential access), the process, at 760, waits for the I/O operation to complete. It should be noted that an example process for waiting for the I/O operation to complete is illustrated in flowchart 600B of FIG. 6B.

However, if the on-disk inode access pattern does trigger the metadata read-ahead, the process, at 765, determines whether a chunk total (e.g., a total number of chunks of on-disk inode metadata to be read ahead or "N") is less than or equal to a metadata read-ahead value (e.g., issued metadata read-ahead value 280 or a total issued metadata read-ahead value). If the chunk total is not less than or equal to the metadata read-ahead value, the process, at 760, waits for the I/O operation to complete. However, if the chunk total is less than or equal to the metadata read-ahead value, the process, at 770, issues a next chunk of asynchronous metadata read-ahead, and at 775, determines whether the I/O operation is complete. If the I/O operation is not complete, the process, at 780, increments a counter (e.g., for the issued metadata read-ahead), and loops back to 765. However, if the I/O operation is complete, the process, at 785, generates a separate thread and issues the remaining chunks of the asynchronous metadata read-ahead. At 790, the process determines if there is another I/O operation. If there is another I/O operation, the process loops back to 745. Otherwise, the process ends.

Typically, if an I/O operation is blocked, a thread cannot progress any further. It will be appreciated that because the methods, systems, and processes of inode access pattern detection and metadata read-ahead generation are performed in the context of the blocking thread (and while the original I/O is waiting for completion in the background), inode access pattern detection overhead on system performance is reduced. In addition, permitting the original I/O operation to complete can also avoid the cost of creating and scheduling separate threads (which can delay the availability of data blocks for subsequent read operations).

Further, it should be noted that other data structures such as attributes can be associated with nodes. The methods, systems, and processes related to inode access pattern detection and issuing metadata read-ahead instructions described herein can pre-populate these (other) data structures in memory and can initialize various inode locks asynchronously. Therefore, it will be appreciated that the methods, systems, and processes described herein are capable of tracking access patterns of inodes based on chunk access, sequential access, and non-sequential access, and issuing read-ahead instructions for inodes, among other capabilities.

Example Computing Environment

Figure 8:
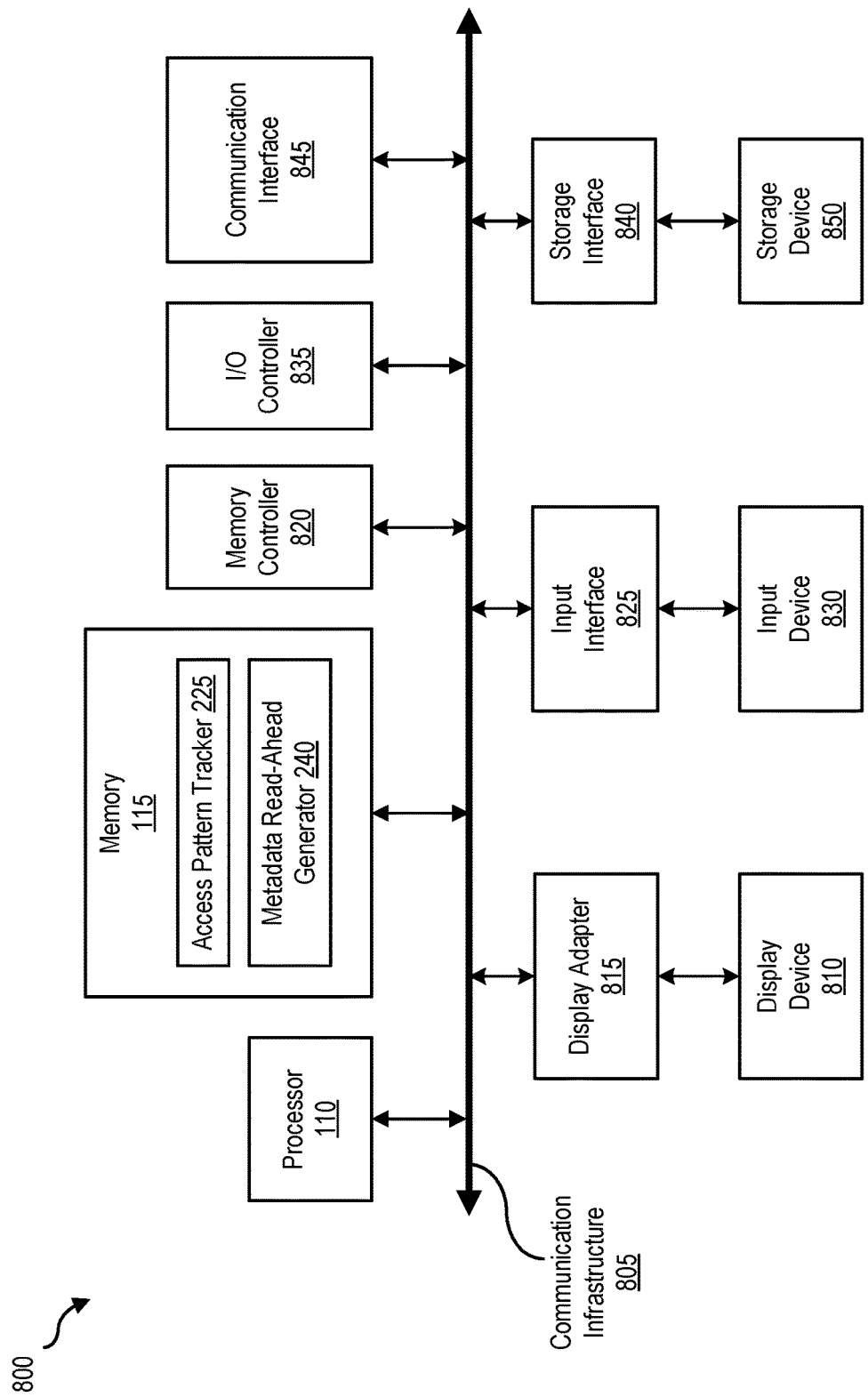
FIG. 8 is a block diagram of a computing system, illustrating how an access pattern tracker and a metadata read-ahead generator can be implemented in software, according to one embodiment of the present disclosure.

FIG. 8 is a block diagram of a computing system 800, illustrating how an access pattern tracker and a metadata read-ahead generator can be implemented in software, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 110 and a memory 115. By executing the software that implements computing device 105, computing system 800 becomes a special purpose computing device that is configured to track inode access pattern(s) and issue read-ahead instructions for inodes.

Processor 110 generally represents any type or form of processing unit capable of processing data or interpreting and executing instructions. In certain embodiments, processor 110 may receive instructions from a software application or module. These instructions may cause processor 110 to perform the functions of one or more of the embodiments described and/or illustrated herein. For example, processor 110 may perform and/or be a means for performing all or some of the operations described herein. Processor 110 may also perform and/or be a means for performing any other operations, methods, or processes described and/or illustrated herein.

Memory 115 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing an access pattern tracker and a metadata read-ahead generator may be loaded into memory 115.

In certain embodiments, computing system 800 may also include one or more components or elements in addition to processor 110 and/or memory 115. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 110, memory 115, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of one or more computing devices such as computing device 105. For example, in certain embodiments I/O controller 835 may control or facilitate transfer of data between one or more elements of computing system 800, such as processor 110, memory 115, communication interface 845, display adapter 815, input interface 825, and/or storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 (e.g., disk 150) coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 110, a computer program loaded into computing system 800 may cause processor 110 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
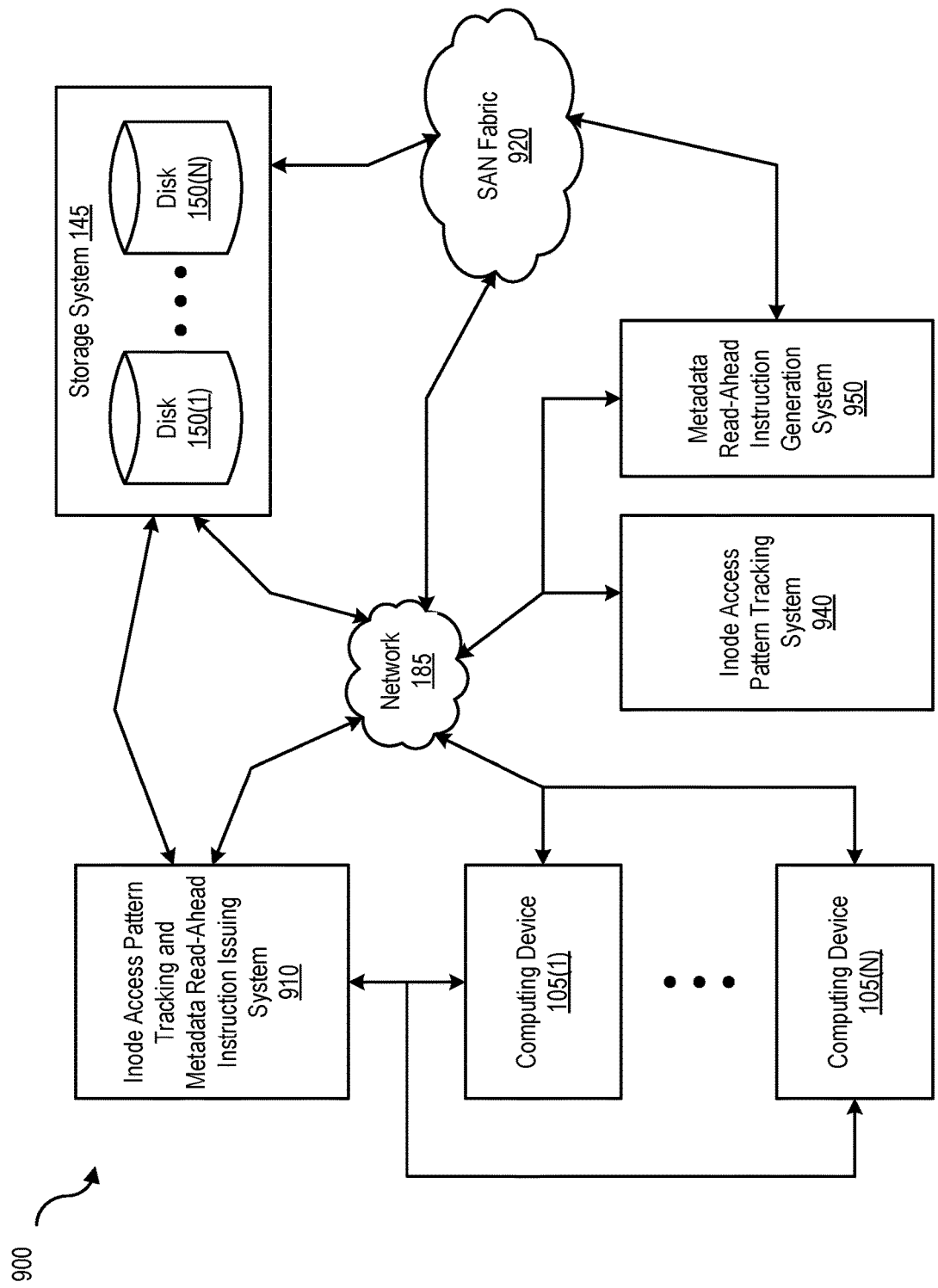
FIG. 9 is a block diagram of a networked system, illustrating how various computing devices can communicate via a network, according to one embodiment of the present disclosure.

FIG. 9 is a block diagram of a networked system 900, illustrating how various devices can communicate via a network, according to one embodiment. In certain embodiments, network-attached storage (NAS) devices may be configured to communicate with computing device 105 and storage system 145 using various protocols, such as Network File System (NFS), Server Message Block (SMB), or Common Internet File System (CIFS), among others.

Network 185 generally represents any type or form of computer network or architecture capable of facilitating communication between computing device 105 and storage system 145. In certain embodiments, a communication interface, such as communication interface 845 in FIG. 8, may be used to provide connectivity between computing device 105, storage system 145, and network 155. It should be noted that the embodiments described and/or illustrated herein are not limited to the Internet or any particular network-based environment. For example, network 185 can be a Storage Area Network (SAN). Computing device 105 and storage system 145 can be integrated or separate. If separate, for example, computing device 105 and storage system 145 can be coupled by a local connection (e.g., using Bluetooth™, Peripheral Component Interconnect (PCI), Small Computer System Interface (SCSI), or the like), or via one or more networks such as the Internet, a LAN, or a SAN.

In one embodiment, all or a portion of one or more of the disclosed embodiments may be encoded as a computer program and loaded onto and executed by computing device 105, inode access pattern tracking and metadata read-ahead instruction issuing system 910, inode access pattern tracking system 940, and/or metadata read-ahead instruction generation system 950. All or a portion of one or more of the embodiments disclosed herein may also be encoded as a computer program, stored on computing device 105, inode access pattern tracking and metadata read-ahead instruction issuing system 910, and/or inode access pattern tracking system 940, and distributed over network 185.

In some examples, all or a portion of computing device 105 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, computing device 105 and/or inode access pattern tracking and metadata read-ahead instruction issuing system 910 may transform the behavior of computing device 105 in order to cause computing device 105 and/or inode access pattern tracking and metadata read-ahead instruction issuing system 910 to track access pattern(s) of inodes and issue read-ahead instructions.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method implemented in a computer system, comprising:
 identifying a unit of metadata in a file system;
 identifying a file system structure in the file system, wherein the file system structure is associated with the unit of metadata;
 determining whether an entry corresponding to the file system structure exists in a global list of units of metadata; and
 in response to a determination that the entry exists in the global list of units of metadata,
  determining whether a file structure of the file system structure is non-sequential,
   wherein
   the determining comprises
    accessing the file system structure, and
  in response to a determination that the file structure is non-sequential,
   retrieving a list of units of metadata from the global list of units of metadata, wherein
    the list of units of metadata corresponds to the entry, and
    the units of metadata identified in the list of units of metadata are stored in a storage device of the computer system, and
   issuing a read-ahead instruction for one or more of the units of metadata identified in the list of units of metadata.

2. The method of claim 1, wherein
the read-ahead instruction is an asynchronous read-ahead instruction.

3. The method of claim 1, wherein
intercepting a read command, wherein
 the storage device is a non-volatile storage unit,
 the read command is configured to cause a read operation to be performed using a unit of metadata of the units of metadata,
 the unit of metadata is associated with the non-volatile storage unit by virtue of the file system, and
 the intercepting is performed in response to an input/output operation being issued for a data chunk associated with the unit of metadata.

4. The method of claim 3, wherein
analyzing an issued read-ahead amount in the read-ahead instruction using a data chunk total; and
in response to the analyzing indicating that the read-ahead instruction can be issued, performing the issuing.

5. The method of claim 4, wherein
in response to the analyzing indicating that the input/output operation should complete, waiting for completion of the input/output operation.

6. The method of claim 5, wherein the waiting for the completion of the input/output operation comprises:
 determining whether the input/output operation is complete; and
 in response to a determination that the input/output operation is not complete, updating a data chunk total of the read-ahead instruction, and continuing performance of the analyzing.

7. The method of claim 6, wherein the waiting for the completion of the input/output operation further comprises:
 in response to a determination that the input/output operation is complete, generating a queue, and
  including one or more remaining data chunks in the read-ahead instruction, wherein
   the one or more remaining data chunks were not yet included in the read-ahead instruction.

8. The method of claim 1, wherein the list of units of metadata is a global inode list, and the identifying the file system structure in the file system comprises:
 accessing the global inode list, wherein
  the unit of metadata is an inode; and
 identifying a directory inode in the global inode list, wherein
  the directory inode is associated with a parent directory of the inode.

9. The method of claim 1, wherein the list of units of metadata is a global inode list, and the method further comprises:
 accessing a file in the file system, wherein
  the unit of metadata is an inode associated with the file; and
 searching the global inode list for a directory inode, wherein
  the file is stored in a directory in the file system,
  the directory inode is associated with the directory.

10. The method of claim 9, further comprising:
 in response to the directory inode being found in the global inode list, determining a file structure of the directory.

11. The method of claim 9, wherein the determining the file structure of the directory comprises:
 performing the determining whether a file structure of the file system structure is non-sequential; and
 in response to a determination that the file structure is sequential, issuing a read-ahead instruction to perform a read operation on another inode, wherein the another inode is an inode other than the inode.

12. The method of claim 11, wherein
the units of metadata are inodes stored in the storage device,
the file structure is sequential, if inode numbers of the inodes are sequential, and
the file structure is non-sequential, if the inode numbers of the inodes are not sequential.

13. The method of claim 9, further comprising:
in response to the directory inode not being found in the global inode list, adding an entry to the global inode list, wherein
 the entry if for the unit of metadata.

14. The method of claim 1, wherein
the unit of metadata is an inode,
the global list of units of metadata is a global inode list,
the determining whether the entry corresponding to the file system structure exists in the global list of units of metadata comprises attempting to identify a directory inode in the global inode list, and
the directory inode is associated with a parent directory of the inode.

15. A computer program product comprising:
a plurality of instructions, configured to, when executed by one or more processors of a computer system, cause the one or more processors to
  identify a unit of metadata in a file system,
  identify a file system structure in the file system, wherein the file system structure is associated with the unit of metadata,
  determine whether an entry corresponding to the file system structure exists in a global list of units of metadata, and
  in response to a determination that the entry exists in the global list of units of metadata,
    determine whether a file structure of the file system structure is non-sequential, wherein
      whether the file structure of the file system structure is non-sequential is determined by accessing the file system structure, and
      in response to a determination that the file structure is non-sequential, retrieve a list of units of metadata from the global list of units of metadata, wherein
        the list of units of metadata corresponds to the entry, and
        the units of metadata identified in the list of units of metadata are stored in a storage device of the computer system, and
      issue a read-ahead instruction for one or more of the units of metadata identified in the list of units of metadata; and
a non-transitory computer-readable storage medium, wherein the plurality of instructions are encoded in the non-transitory computer-readable storage medium.

16. The computer program product of claim 15, wherein the plurality of instructions are further configured to cause the one or more processors to:
  intercept a read command, wherein
    the storage device is a non-volatile storage unit,
    the read command is configured to cause a read operation to be performed using a unit of metadata of the units of metadata,
    the unit of metadata is associated with the non-volatile storage unit by virtue of the file system, and
    the read command is intercepted in response to an input/output operation being issued for a data chunk associated with the unit of metadata.

17. The computer program product of claim 16, wherein the plurality of instructions are further configured to cause the one or more processors to:
  analyze an issued read-ahead amount in the read-ahead instruction using a data chunk total; and
  in response to an indication that the read-ahead instruction can be issued, issue the read-ahead instruction.

18. The computer program product of claim 15, wherein the plurality of instructions are further configured to cause the one or more processors to:
  access a file in the file system, wherein
    the unit of metadata is an inode associated with the file, and
    the list of units of metadata is a global inode list;
  search the global inode list for a directory inode, wherein
    the file is stored in a directory in the file system,
    the directory inode is associated with the directory;
  determine whether a file structure of the file system structure is non-sequential;
  in response to the determination that the file structure is non-sequential, retrieve the list of units of metadata; and
  in response to a determination that the file structure is sequential, issue a read-ahead instruction to perform a read operation on another inode, wherein the another inode is an inode other than the inode,
    the units of metadata are inodes stored in the storage device,
    the file structure is sequential, if inode numbers of the inodes are sequential, and
    the file structure is non-sequential, if the inode numbers of the inodes are not sequential.

19. The computer program product of claim 15, wherein
the unit of metadata is an inode,
the global list of units of metadata is a global inode list, and
the plurality of instructions configured to cause the one or more processors to determine whether the entry corresponding to the file system structure exists in the global list of units of metadata comprises further instructions configured to cause the one or more processors to attempt to identify a directory inode in the global inode list, wherein
  the directory inode is associated with a parent directory of the inode.

20. A computer system comprising:
one or more processors;
a computer-readable storage medium coupled to the one or more processors; and
a plurality of instructions, encoded in the computer-readable storage medium and configured to cause the one or more processors to
  identify a unit of metadata in a file system,
  identify a file system structure in the file system, wherein the file system structure is associated with the unit of metadata,
  determine whether an entry corresponding to the file system structure exists in a global list of units of metadata, and
  in response to a determination that the entry exists in the global list of units of metadata,
    determine whether a file structure of the file system structure is non-sequential, wherein
      whether the file structure of the file system structure is non-sequential is determined by accessing the file system structure, and
      in response to a determination that the file structure is non-sequential, retrieve a list of units of metadata from the global list of units of metadata, wherein
        the list of units of metadata corresponds to the entry, and
        the units of metadata identified in the list of units of metadata are stored in a storage device of the computer system, and
      issue a read-ahead instruction for one or more of the units of metadata identified in the list of units of metadata.

* * * * *